United States Patent Office 3,391,118
Patented July 2, 1968

3,391,118
FLUORINATED ELASTOMER WITH OXYGEN IN CHAIN
Edward W. Cook, Princeton, N.J., assignor to FMC Corporation, New York, N.Y., a corporation of Delaware
No Drawing. Filed May 7, 1965, Ser. No. 454,193
8 Claims. (Cl. 260—61)

ABSTRACT OF THE DISCLOSURE

Fluorinated elastomers having a polymeric structure of alternating diene and diol units are prepared by reacting a substantially fluorinated terminal diene with a substantially fluorinated diol free of fluorine substitution on the hydroxy carbon atoms in the presence of an alkali.

---

This invention relates to fluorinated elastomers designed to have excellent flexibility at low temperatures.

I have discovered that terminal diols which are completely or almost completely perfluorinated will react with highly fluorinated terminal dienes in the presence of KOH or other alkaline condensing agents, to produce elastomeric polymers which can be identified by proton nuclear magnetic resonance (NMR) as having a structure in which diene moieties alternate with diol moieties, the polymers terminating with a group derived either from the diol or from the diene and which are characterized by extremely good low temperature properties.

The diols which can be used include highly flurionated aliphatic alpha-omega diols, either acyclic or cyclic, and perfluorinated aromatic diols in which the hydroxyls are in the para position, so that they are in effect terminal. In the case of cycloaliphatic diols, the hydroxyls should similarly be at opposite ends of the ring. Even in the most highly fluorinated diols, the carbon atoms to which the hydroxyls are attached will have no fluorine substituent, since such compounds are unstable.

The dienes may be any highly fluorinated alpha-omega acyclic aliphatic dienes, or cycloaliphatic dienes in which the double bonds are at opposite ends of the ring; the dienes may be perfluorinated, or may contain minor numbers of other substituents such as hydrogen or chlorine.

Typical examples of my invention are here given by way of illustration and are not to be considered limiting of my invention.

sodium salt of $Cl(CF_2CFCl)_3CF_2COOH$, by decarboxylation under vacuum. In a typical preparation, 267 grams of this sodium salt $Cl(CF_2CFCl)_3CF_2-COONa$ were placed in a 1 liter vacuum flask, which was evacuated through a dry ice-cooled trap to about 1 mm. pressure, and then heated to 150° C. The precursor TCPFH distilled into the trap, was washed with water, 10% aqueous sodium carbonate, and water again, and dried. Distillation of the crude dried product gave 159 grams of pure TCPFH boiling at 161–162° C.—a 75% yield. Its infrared spectrum checked that of known material.

The 4-chloroperfluoroheptadiene-1,6 was prepared as follows:

To a stirred refluxing mixture of 16 g. (0.25 mole) of zinc dust, 1 g. of zinc chloride, and 25 ml. of isopropanol was added 39.9 g. (0.1 mole) of 4,6,7-trichloroperfluoro-1-heptene over a six hour period. After refluxing an additional 0.5 hour, the mixture was filtered from unreacted zinc and the filtrate diluted with several volumes of water. The organic layer was taken up in methylene chloride, water washed several times, and dried over magnesium sulfate. Distillation gave a 11.3 g. of product, B.P. 97–112° C./761 mm., $n_D^{25}$ 1.3311. The purity by gas chromatography was 67.5%.

The product can be further purified by redistillation, or it can be used in crude forms, using the crude in correct proportion to give the indicated amount of reactant.

The following experiment is typical of those carried out. All are tabulated in the table which follows this description of procedure.

To 11 g. of the pentanediol in 20 ml. acetone was added 3.0 g. potassium hydroxide. This mixture was then rapidly poured into 16 g. of the heptadiene contained in a 250 ml. Erlenmeyer flask and the resultant mixture stirred magnetically. The light yellow color which formed immediately slowly darkened and, after 72 hrs., tan to brown polymer was found in the flask along with a viscous oil. The oil was dissolved in acetone, the solution decanted, and the polymer washed with acetone. The polymer was leached with acetone in a Soxhlet extractor overnight and then dried in a vacuum oven.

Using this procedure the yield of elastomer is generally about 20%, while the lower molecular weight oils are obtained in about 50% yield. The elastomer has extremely good low temperature properties. The value of the glass transition point ($T_g$) appears to be in the neighborhood of −50° C.

TABLE. COPOLYMERIZATION OF 4-CHLOROPERFLUOROHEPTADIENE-1,6 WITH 2,2,3,3,4,4-HEXAFLUOROPENTANEDIOL-1,5

| Example | Amt. Diol (g.) | Amt. Diene (g.) | KOH (g.) | Solvent Amt. (ml.) | Oil Amt.[1] (g.) | Polymer [2] Amt. (g.) | $T_g$, °C. |
|---|---|---|---|---|---|---|---|
| 1 | 11 | 16.0 | 3.0 | 20 acetone | | 6 | −58 |
| 2 | 5.5 | 8.0 | 1.5 | 10 acetone | 5.7 | [3] 8.1 | |
| 3 | 5.5 | 8.2 | 1.5 | do | 5.5 | 2.1 | −48 |
| 4 | 5.5 | 8.0 | 1.7 | do | 8 | 3.5 | −47 |
| 5 | 11 | 16.0 | 3.0 | 20 acetone | 13.4 | 5.7 | −57 |

[1] There are mechanical losses.
[2] Constants determined with Differential Scanning Calorimeter.
[3] Lower molecular weight products not extracted from polymer.

Examples 1 to 5.—2,2,3,3,4,4-hexafluoropentanediol-1,5 and 4-chloroperfluoroheptadiene-1,6

The diol used, a known compound, has recently become available on the market; the 4-chloroperfluoroheptadiene-1,6 can be prepared from 4,6,7-trichloroperfluoroheptene-1 by dechlorination with zinc at low temperatures (reflux in isopropanol or tetrahydrofuran).

The precursor 4,6,7 - trichloroperfluoroheptene - 1 (TCPFH) can be prepared in known manner from the Example 6

5.5 g. of the pentanediol of Example 1 was suspended in a mixture of 5 ml. of hexane and 5 ml. of benzene, ½ g. of KOH was added to the mixture and it was then poured into 8 g. of the heptadiene contained in the 250 ml. Erlenmeyer flask and the resultant mixture was stirred for several weeks at reflux. The resultant polymer was separated from the solvent, washed with solvent in a Soxhlet extractor overnight and dried. 10.7 g. of polymer was obtained with a $T_g$ of $-54°$ C. This indicates that prolonged reaction time increases polymer yield substantially.

Example 7

Example 1 was repeated, but the reaction, instead of being run at room temperature, was run at reflux (ca. 60° C.) for 20 minutes. Polymer yield was 9.3 g.

Example 8

Example 1 was repeated, except polymerization was allowed to continue for 24 days. Yield was 24 g.

All of the polymers of Examples 1 to 8 were demonstrated, by proton nuclear magnetic resonance (NMR), to have the structure

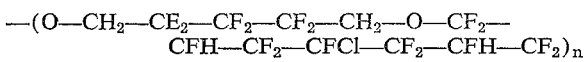

The presence of fluorine on both sides of the ether linkages makes the polymer highly resistant to hydrolysis.

Example 9

In like manner to Example 1, 18 parts tetrafluorohydroquinone, 16 parts hexafluoro-1,3-butadiene, and 6 parts potassium hydroxide in 50 parts acetone were stirred in a small glass pressure vessel under autogenous pressure for 3 days at room temperature; 18 parts of elastomeric product were recovered. NMR analysis confirmed a linear alternating structure of the general type shown for Examples 1 to 8.

Example 10

A mixture of 18 parts perfluoro-1,7-octadiene (I. L. Knunyants et al., Izvest. Akad. Nauk, Otdel. Khim. Nauk, 1462 (1961)), 13 parts 2,2,3,3,4,4,5,5-octafluorohexane-1,6-diol (which was readily prepared by permanganate oxidation of the above diolefin followed by lithium aluminum hydride reduction of the dicarboxylic acid) and 2.8 parts potassium hydroxide in 45 parts acetone gave 10 parts elastomeric product after 4 days at room temperature.

Example 11

In like manner, 29 parts 2,2,3,4,4,5,5,6,7,7-decafluorooctane-1,8-diol (readily prepared from methanol and perfluorohexadiene by the method of J. D. La Zerte and R. J. Kosher, J. Am. Chem. Soc. 77, 910 (1955)), 21 parts perfluoropentadiene-1,5 (which was prepared in a manner similar to 4-chloroperfluorohepta-1,7-diene) and 5.6 parts potassium hydroxide in 38 parts acetone gave 14 parts elastomer after 2 days.

Example 12

From 24 parts 2,2-3,3-tetrafluorobutane-1,4-diol (prepared by lithium aluminum hydride reduction of perfluorosuccinic acid), 34 parts perfluorocyclohexadiene-1,3 and 8 parts potassium hydroxide in 50 parts water was obtained 17 parts elastomer after 3 days.

NMR analysis of the products of Examples 10 to 12 confirmed the linear alternating structure typical of the polymers of this invention.

Obviously, the examples can be multiplied indefinitely, without departing from the scope of the invention as defined in the claims.

I claim:

1. The method of making polymers which comprises bringing together a highly fluorinated terminal diol and a highly fluorinated terminal diene in the presence of an alkali and allowing the reaction to proceed until an elastic copolymer is produced.

2. The elastomers obtained by reacting a highly fluorinated terminal diol free of fluorine substitution on the hydroxyl carbon atoms with a highly fluorinated terminal diene in the presence of an alkali.

3. The elastomers of claim 2, in which the diol is an alpha-omega chain compound, and the diene is an alpha-omega straight chain diene.

4. The elastomer obtained by reacting 2,2,3,3,4,4-hexafluoropentanediol-1,5 with 4-chloroperfluoroheptadiene-1,6 in the presence of an alkali.

5. The elastomer obtained by reacting tetrafluorohydroquinone with hexafluoro-1,3-butadiene in the presence of an alkali.

6. The elastomer obtained by reacting perfluoro-1,7-octadiene with 2,2,3,3,4,4,5,5-octafluorohexane-1,6-diol in the presence of an alkali.

7. The elastomer obtained by reacting 2,2,3,4,4,5,5,6,7,7-decafluorooctane-1,8-diol with perfluoropentadiene-1,5 in the presence of an alkali.

8. The elastomer obtained by reacting 2,2-3,3-tetrafluorobutane-1,4-diol with perfluorocyclohexadiene-1,3 in the presence of an alkali.

References Cited

UNITED STATES PATENTS 3,053,823　9/1962　Brehm et al. _____ 260—921

WILLIAM H. SHORT, *Primary Examiner.*

LOUISE P. QUAST, *Examiner.*

M. GOLDSTEIN, *Assistant Examiner.*

UNITED STATES PATENT OFFICE
CERTIFICATE OF CORRECTION

Patent No. 3,391,118                          July 2, 1968

Edward W. Cook

It is certified that error appears in the above identified patent and that said Letters Patent are hereby corrected as shown below:

Column 3, line 16, "$CE_2$" should read -- $CF_2$ --.

Signed and sealed this 17th day of February 1970.

(SEAL)
Attest:

Edward M. Fletcher, Jr.                      WILLIAM E. SCHUYLER, JR.
Attesting Officer                             Commissioner of Patents